(12) United States Patent  (10) Patent No.: US 8,035,855 B2
Monga et al.  (45) Date of Patent: Oct. 11, 2011

(54) AUTOMATIC SELECTION OF A SUBSET OF REPRESENTATIVE PAGES FROM A MULTI-PAGE DOCUMENT

(75) Inventors: Vishal Monga, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 923 days.

(21) Appl. No.: 12/024,208

(22) Filed: Feb. 1, 2008

(65) Prior Publication Data
US 2009/0195796 A1 Aug. 6, 2009

(51) Int. Cl.
G06F 15/00 (2006.01)
(52) U.S. Cl. ......... 358/1.9; 358/1.18; 707/736; 707/737
(58) Field of Classification Search ............. 358/1.1, 358/1.9, 1.18, 453; 382/173–180; 707/705, 707/736, 737
See application file for complete search history.

(56) References Cited

U.S. PATENT DOCUMENTS

| | | | |
|---|---|---|---|
| 5,619,709 A * | 4/1997 | Caid et al. | 715/209 |
| 6,560,597 B1 * | 5/2003 | Dhillon et al. | 1/1 |
| 7,194,461 B2 * | 3/2007 | Kawatani | 707/749 |
| 7,711,679 B2 * | 5/2010 | Patterson | 707/715 |
| 2006/0152748 A1 | 7/2006 | McCarthy et al. | |
| 2007/0146830 A1 | 6/2007 | Eschbach | |

* cited by examiner

Primary Examiner — Thomas D Lee
(74) Attorney, Agent, or Firm — Philip E. Blair; Fleit Gibbons Gutman Bongini & Bianco P.L.

(57) ABSTRACT

What is provided herein is a method for automatically selecting a subset of pages from a multi-page document for image processing wherein each selected page is substantially different from all other pages according to certain features of interest and wherein the combined content of the selected pages approximately represents the content in the entire document. Selected pages are clustered wherein each page is represented by a feature vector meaningfully related to the task to be performed. A matrix of feature vectors is analyzed. Basis vectors are extracted from the matrix using rank-reduction techniques. Clustering is performed by subspace projection of page features onto the basis vectors with each page being assigned to a cluster to which that page maximally projects. Representative pages are selected from each cluster. The representative pages can then be used as input to a secondary process.

21 Claims, 4 Drawing Sheets

AUTOMATIC SELECTION OF A SUBSET OF REPRESENTATIVE PAGES FROM A MULTI-PAGE DOCUMENT

TECHNICAL FIELD

The present invention is directed to methods for automatically selecting a subset of representative pages from a multi-page document for applications performing subsequent image processing operations.

BACKGROUND

Many image processing applications involve performing complex operations on multi-page documents. Examples include color correction, color palette design, proofing, image enhancement, etc. Derivation of the parameters of these imaging operations often involves analyzing the document content. When the documents are large, this can involve substantial cost by way of computer processing, storage, memory, or user operations.

In such cases, a large multi-page document undergoing subsequent complex image processing operations must first be properly characterized. This often entails selecting a small subset of representative pages from the multi-page document according to a set of features of interest. The complex imaging operations to be performed on the entire multi-page document based on the content from the selected pages are then optimized. The optimized imaging operation is then applied to the multi-page document.

The task of selecting the subset of representative pages is often done manually by a human operator who examines the large multi-page document in advance of performing one or more complex imaging operations and selects representative pages to derive and optimize the subsequent operations. The time devoted to this process can be significant in instances in document reproduction operations wherein the multi-page document can be relatively large. In many cases, the time and cost elements associated with this task can be prohibitive. If the subset of selected pages is not representative of the entire multi-page document then the optimized imaging operations may not be accurate and the finished results may be of insufficient quality. This may require, after the subsequent imaging operation is performed on the large multi-page document, that the entire selection process begin again. This can be prohibitive in imaging operations requiring more automated workflows.

Techniques found in the arts interpret document pages as nodes of a graph and subsequently apply graph partitioning techniques. Methods for graph partitioning are usually suited for semantic, high-level features where it may be difficult to attach a correspondence between features from different pages. Others use clustering techniques to group documents on a network or database. But, such techniques are directed primarily to the textual content of the document and not to other aspects or characteristics of the information associated with the document, particularly printing characteristics.

What is needed is a method for automatically selecting a small number of representative pages from a large multi-page document which accurately characterizes the overall document such that subsequent image processing operations to be performed can be properly optimized.

BRIEF SUMMARY

What is provided herein is a novel system, method, and computer program product for automatically selecting a subset of pages from a multi-page document for image processing wherein each selected page is substantially different from all other pages according to certain features of interest and wherein the combined content of the selected pages approximately represents the content in the entire document.

In one example embodiment, a multi-page document is received. A defined number of pages are obtained from the multi-page document wherein each page contains at least one color object. Each page is represented by a feature that is related to a subsequent imaging operation to be performed on the multi-page document. For each page, at least one feature vector that encapsulates relevant content in the document is extracted to produce a feature vector space. In one embodiment, the feature vector comprises a multi-dimensional color histogram. The extracted features are arranged into vectors to form a matrix. The matrix is then analyzed using a rank reduction technique to obtain a set of basis vectors which describe the feature vector space. Each page is assigned to a most closely matched basis vector to form page clusters. The pages are clustered by a subspace projection of features onto the set of basis vectors and assigned to a cluster to which that page maximally projects. At least one representative page is selected from each page cluster. The representative pages can then be used as input to a secondary process, examples of which include deriving imaging operations to be applied to the document, or some other automated or manual analysis of the document.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided herein is a novel system and method for automatically selecting a subset of pages from a multi-page document for image processing wherein each selected page is substantially different from all other pages according to certain features of interest and wherein the combined content of the selected pages approximately represents the content in the entire document.

It should be understood that one of ordinary skill in this art would be readily familiar with many facets of color science such as, but not limited to, color space, imaging, color transformation, color calibration, gamut mapping, and other related techniques and algorithms commonly found in the color science arts. Additionally, one of ordinary skill in this art would also be familiar with advanced mathematical techniques such as vectors, matrix methods, and the like as they relate to color manipulation and color transformation. One of ordinary skill in this art would also be knowledgeable about computer science and software and programming sufficient to implement the functionality and capabilities described in detail herein in their own hardware environments without undue experimentation.

For discussion purposes, what is described is one example embodiment wherein each page of the multi-page document is interpreted as containing a single object. As used herein, the term "object" means color critical content such as images, graphics, pictures, colors, text, and the like. Each page can contain multiple objects. The subsequent imaging operation to be optimized is a color operation which is dependent on the color of the objects.

Figure 1:
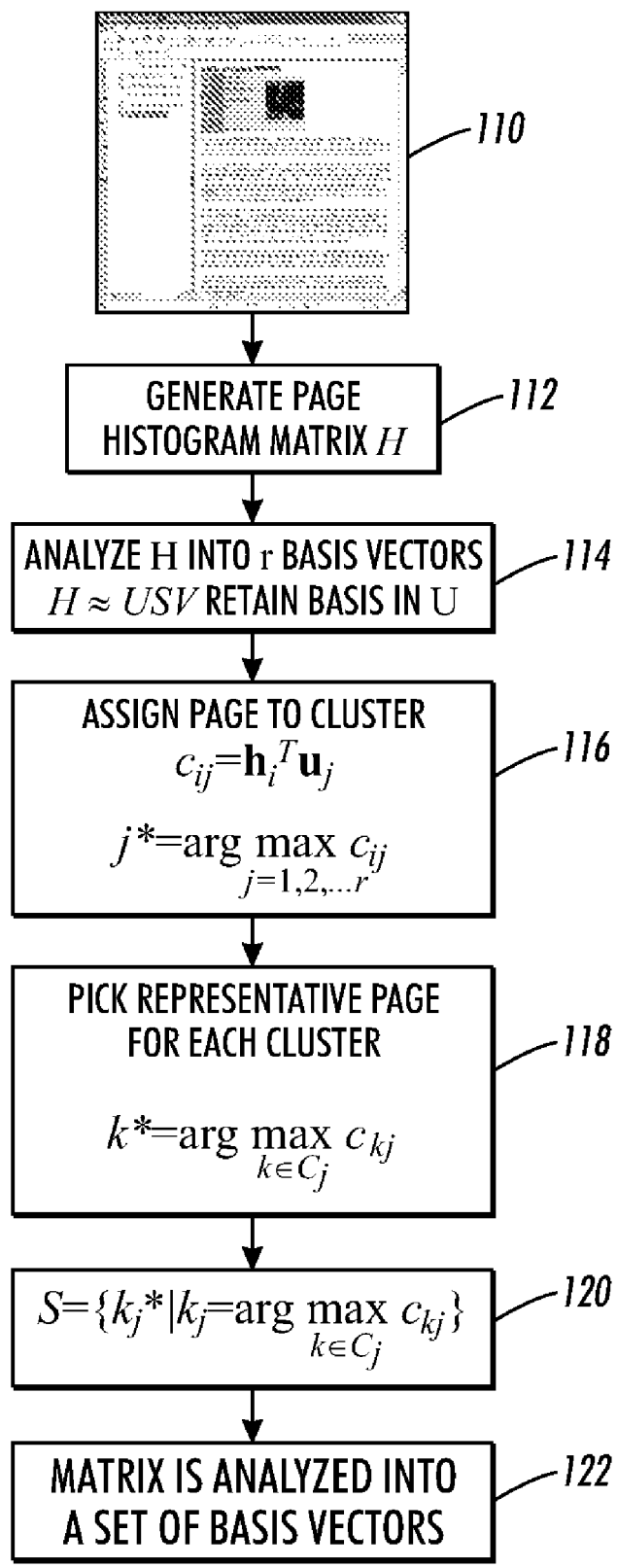
FIG. 1 illustrates one embodiment of the automatic selection of a sub-set of pages from a target multi-page pdf document.

Reference is now being made to FIG. 1 which illustrates the automatic selection of a sub-set of representative pages for pdf document 110.

As a pre-processing step, a multi-dimensional color histogram is extracted from each page of the target PDF document. A generic description for a 3-D representation of color, e.g., RGB or CIELAB, is provided. The histogram is a map from $R^3 \rightarrow R^+$. In practice, the histogram is condensed, i.e., realized for a certain number of bins. Assuming, P partitions per color dimension, the histogram can be represented as a vector of length $M=P^3$. In particular, a matrix of (per-page) histograms is developed, as given by $H=[h_1, h_2, h_3, h_4 \ldots h_N]$, where $h_i \in R^M$, and N denotes the total number of pages in the target document.

The choice of a multi-dimensional histogram as a feature is motivated by two reasons. First, by definition the color histogram provides a measure of the distribution of the color content of the document across the color space. Two pages with largely similar color content are hence likely to have highly correlated color histogram vectors. Second, these histograms can come from rasters of different size, resolution, orientation, aspect ratio, and the like. The vectorized histogram advantageously enables two distinct color pictorials to be brought into a common comparison ground.

At step 112, a matrix H of histogram vectors is generated.

At step 114, the matrix H is analyzed into a set of r basis vectors such that: $H \approx U \cdot S \cdot V$ retain basis in U.

At step 116, the page is assigned to a cluster: $c_{ij} = h^T_i u_j$, where:

$$j^* = \arg\max_{j=1,2,\ldots r} c_{ij}$$

i.e. the cluster label j* is determined by the basis vector most similar to the page feature/histogram At step 118, representative pages are selected from each cluster such that:

$$j^* = \arg\max_{j=1,2,\ldots r} c_{ij}.$$

At step 120, the representative page is given by:

$$S = \left\{ k_j^* \mid k_j = \underset{k \in C_j}{\arg\max}\, c_{kj} \right\}.$$

At step 122, the matrix of vectors is analyzed into a set of basis vectors. This is achieved by letting r be the user specified number of pages desired from the multi-page document. In one embodiment, a rank r decomposition of the matrix H is performed via Singular Value Decomposition. Matrix H is decomposed as follows:

$$H \approx U \cdot S \cdot V$$

where $H \in R^{M \times N}, U \in R^{M \times r}, S \in R^{r \times r}, V \in R^{r \times N}$ One skilled in this art would understand that the columns of U (in a full rank-decomposition) contain a set of basis vectors for the column space of H. The columns of $U=[u_1, u_2 \ldots ur]$ can hence be thought of as the basis histogram vectors. The basis vectors are ordered in significance or in terms of how much variance in the data is captured wherein $u_1$ is the most significant vector that captures the maximum variance in the data, $u_2$ is the next most significant vector, and so on. A rank r approximation to matrix H via Singular Value Decomposition is obtained where r is the user specified number of pages. If no user specified number was available, a full-rank Singular Value Decomposition of matrix H is derived. The rank being determined by observing the decay of singular values in S (rank is formally equal to the number of non-zero singular values).

In one embodiment, Singular Value Decomposition (SVD) is used to derive basis vectors, as described in: *Matrix Analysis*, by: Horn and Johnson, Cambridge University Press (1990), which is incorporated herein by reference in its entirety. Although, the teachings hereof are described by the use of Singular Value Decomposition for decomposing the histogram matrix H, it should be understood that alternate matrix approximation techniques like non-negative matrix approximations (NNMA), as described in: *Generalized Non-negative Matrix Approximations with Bregman Divergences*, by I. S. Dhillon and S. Sra, UTCS Technical Report, June 2005, which is incorporated herein by reference in its entirety. Alternatively, a technique referred to as: Independent Component Analysis (ICA) may be utilized. Other techniques can be used.

Each decomposition technique differing in the sense of the nature of the basis developed by the same. Also, the underlying application or user preference may mandate a particular choice. For example, Singular Value Decomposition follows a nested vector space structure, i.e., rank r−1 decomposition is contained in rank r decomposition. This implies that the selected pages follow a hierarchical structure with Singular Value Decomposition which may be very desirable for some applications.

Continuing, the page whose histogram is most like the basis histogram that identifies the cluster is selected from a given cluster. However, alternate criterion are possible.

As an example, pages can be picked from each cluster whose histograms are most separated from each other. Quantitatively, this is expressed as:

$$(k_1, k_2, \ldots, k_r) = \arg\max_{i \neq j, k_l, k_m} \sum_{i,j=1}^{r} D_{l,m}(C_i, C_j)$$

where $$D_{l,m}(C_i, C_j) = d(h_l, h_m), \text{ for } l \in C_i, m \in C_j$$

Figure 2A:
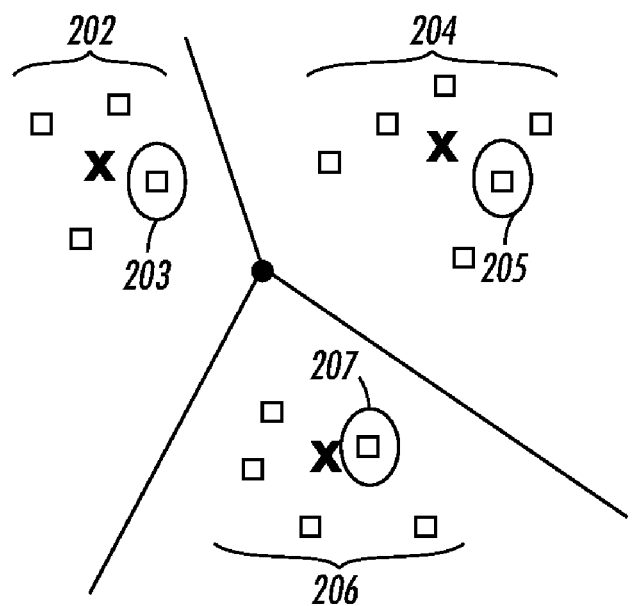
FIGS. 2A and 2B illustrate how the two criterion for selecting representative color pages from a cluster differ from one another.
Figure 2B:
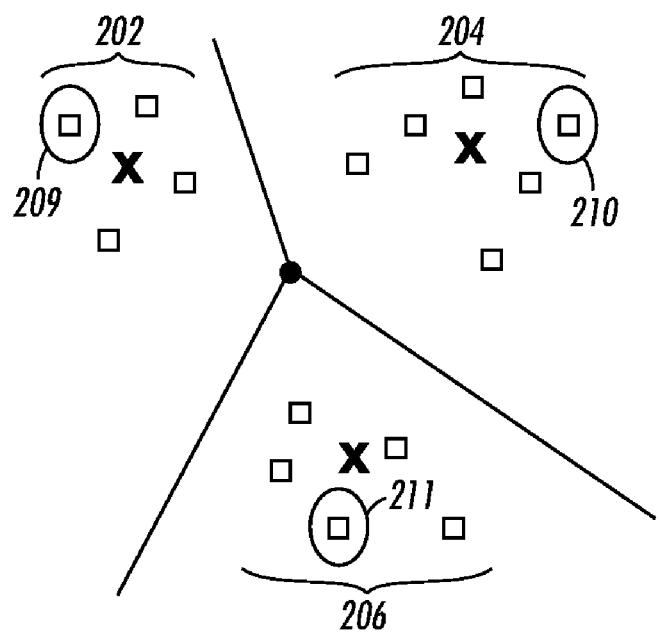

Reference is now being made to FIGS. 2A and 2B which illustrate how two criterion for selecting representative pages from a cluster differ. Different criterion is used to select a representative page from each of the clusters shown. In each case, X is the basis vector in the cluster.

In FIG. 2A, the selection of a representative page from a cluster by the criterion wherein page 203 is selected from cluster 202, page 205 is selected from cluster 204, and page 207 is selected from cluster 206.

In FIG. 2B, the selection of the representative page from a cluster is based on a "maximally separated" criterion wherein page 209 is selected from cluster 202, page 210 is selected from cluster 204, and page 211 is selected from cluster 206. Based on the differing criteria, different representative pages are selected from each cluster.

Figure 3:
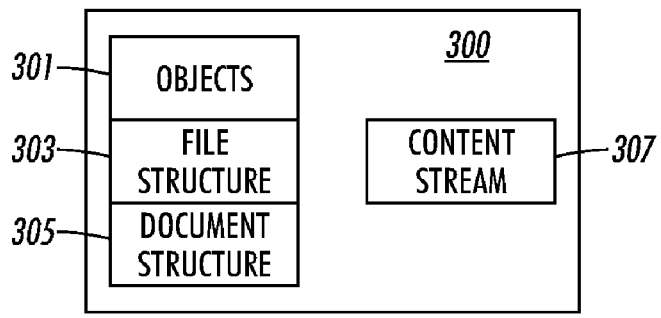
FIG. 3 illustrates a conceptual representation of a pdf document as a plurality of different components.

Reference is now made to FIG. 3 which illustrates the conceptual representation of a pdf document 300 as a plurality of different components.

The pdf document comprises a plurality of objects 301. Objects essentially carry the content of a pdf document. PDF supports the following basic types of objects: Boolean values, integers and real numbers, strings, names, arrays, dictionaries, streams, and null objects. See: *PDF Reference, 6$^{th}$ Edition*, November 2006, which is incorporated herein by reference in its entirety. A pdf document may be synthesized using the objects and additional syntactical information comprising the file structure 303, document structure 305, and content streams 307. In one embodiment, the content stream is an instruction set that synthesizes the pdf document. Common classes of interest such as images, graphics, and text are embedded in the content stream and can be extracted by suitable code.

Further, assume that the pdf document has a total of P object types. Let $O_k$, where k=1,2, ... P, denote the k-th object type. A clustering is performed at the object level. The significance of each object cluster is determined and this significance is mapped at the page level. Each object type $O_k$, is assigned to a cluster $C_{jk}$, where j=1,2, ... , r. Recall that the clusters are ordered in decreasing significance of their corresponding basis histogram vectors $u_{jk}$. The significance of cluster $C_{jk}$ can be defined as: $S_{jk}$=r−j+1, where j is a cluster index for the k-th object. Alternatively, significance $S_{jk}$ would be the singular value associated with basis histogram vectors $u_{jk}$. After the clustering operation, each individual object of type k in the document is assigned to cluster $C_{jk}$ with significance $S_{jk}$.

Next, let $w_k$>0 denote an a-priori weighting indicative of the relative importance of the k-th object type. Such a function is meaningful because many applications may attach greater importance to certain object types over others, e.g. images or graphics over text.

The page significance can be defined as a weighted average of the significances of all objects on that page. Thus, for the i-th page:

$$\gamma_i = \frac{\sum_{k \in K_i} w_k S_{jk}}{\sum_{k \in K} w_k}$$

where $K_i$ is the index set of those object types that are present on the i-th page.

Finally, for a user specified number r, the algorithm selects pages with the r highest $\gamma_i$ values. Note that it is possible to specify different metrics for page significance. Another possible embodiment is to set $y_i$ as the maximum of object significances $S_{jk}$ on the i-th page.

Figure 4:
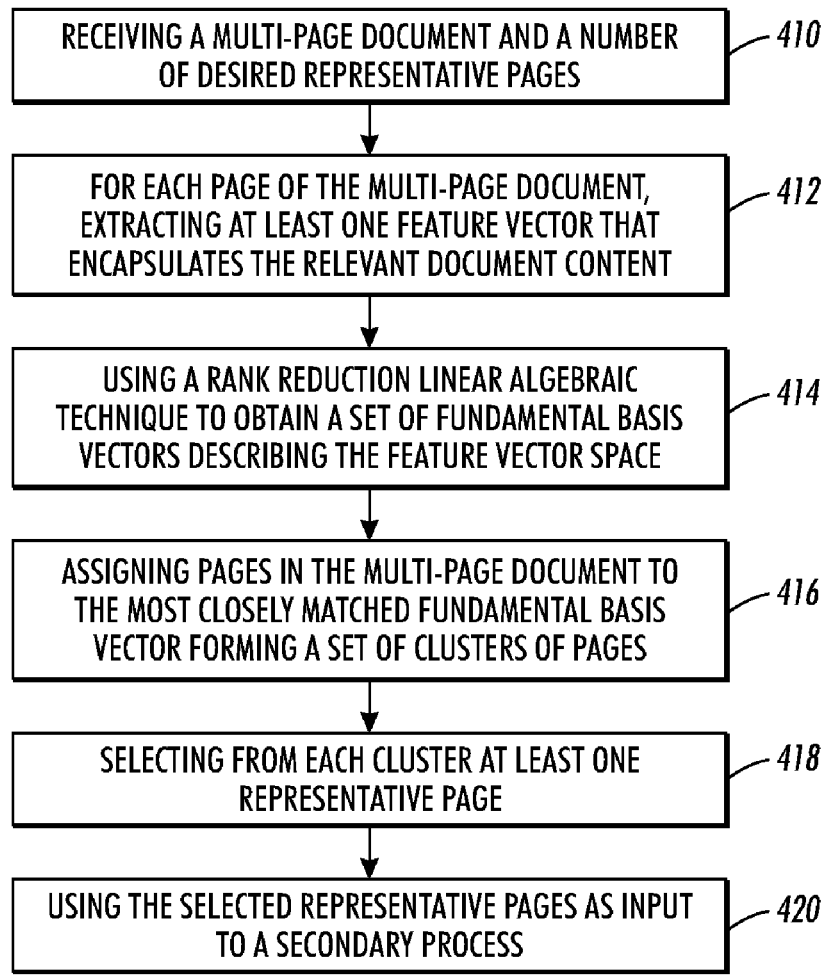
FIG. 4 illustrates a flow diagram of one embodiment of the method for automatically selecting a subset of representative pages from a multi-page document.

Reference is now being made to FIG. 4 illustrating one embodiment of a flow diagram of the present method for automatically selecting a subset of representative pages from a multi-page document.

At step 410, a multi-page document is received. A defined number of pages are obtained from the multi-page document wherein each page contains at least one color object. Each page is represented by a feature that is related to a subsequent imaging operation to be performed on the multi-page document. At step 412, for each page of the multi-page document, at least one feature vector that encapsulates the relevant document content is extracted to produce a feature vector space. In one embodiment, the feature vector comprises a multi-dimensional color histogram. The extracted features are arranged into vectors to form a matrix. At 414, the matrix is analyzed to obtain a set of basis vectors which describe the feature vector space. In one embodiment, the matrix is decomposed into the set of basis vectors through a Singular Value Decomposition, a non-negative matrix approximations, or Independent Component Analysis.

At step 416, pages are assigned to the most closely matched basis vector to form page clusters. In one embodiment, the pages are clustered by a subspace projection of features onto the set of basis vectors and assigned to a cluster to which that page maximally projects. At step 418, a representative page is selected from each page cluster.

At step 420, the selected representative pages are used as input to a secondary process, examples of which include deriving imaging operations to be applied to the document, or some other automated or manual analysis of the document. Alternatively, a subsequent image operation, derived from the color content within the selected representative pages, can be customized for the multi-page document based on the selected representative pages. The imaging operation can be any of: a color correction that is dependent on color content, image summarization, color palette design, proofing, image enhancement, photofinishing, or the like.

It should be understood that the flow diagrams depicted herein are illustrative. Other operations, for example, may be added, modified, enhanced, condensed, integrated, or consolidated. Variations thereof are envisioned and are intended to fall within the scope of the appended claims.

Figure 5:
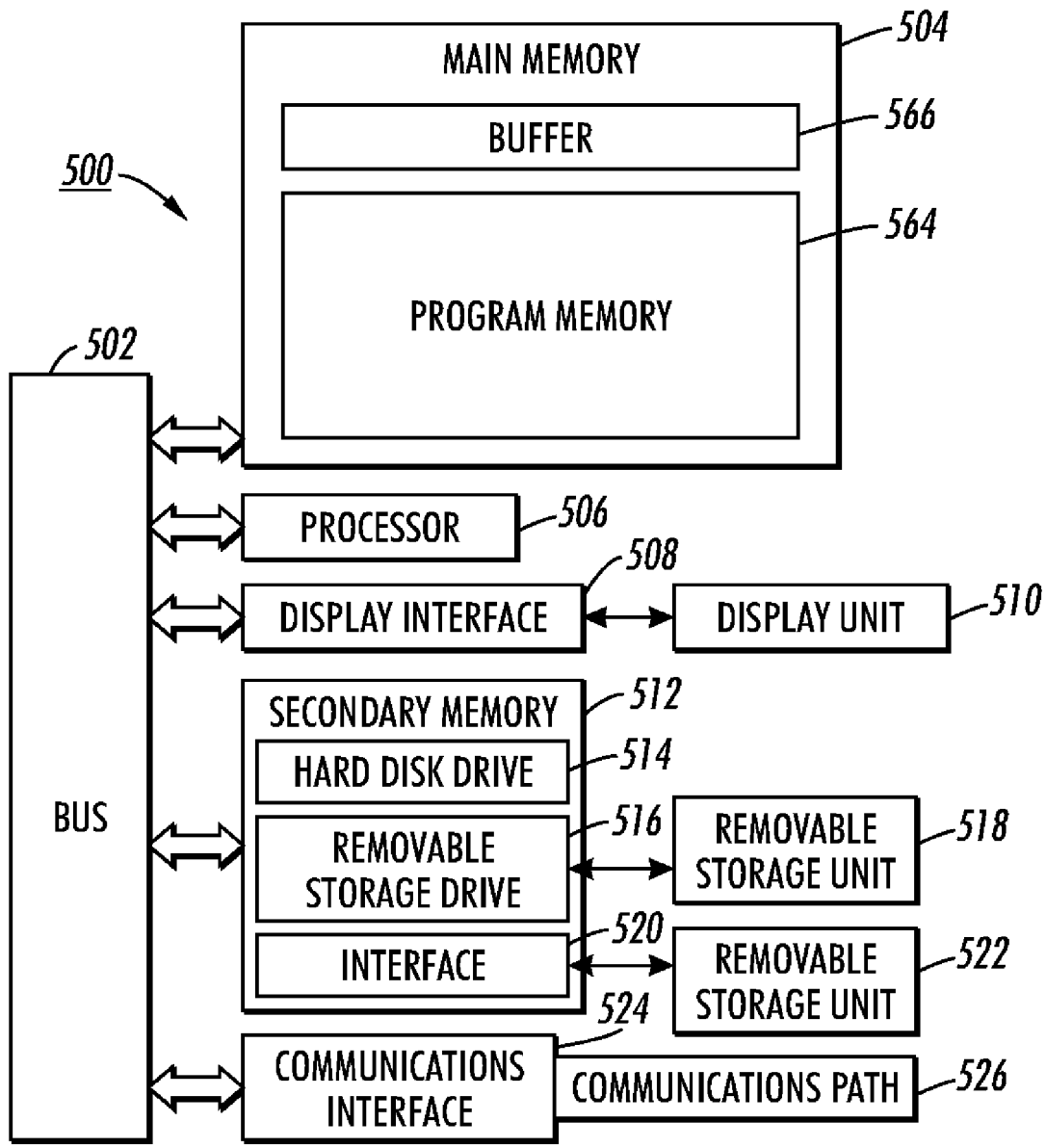
FIG. 5 is a block diagram of a computer system for implementing one embodiment of the method illustrated in the flow diagram of FIG. 4.

Reference is now being made the system of FIG. 5 illustrating one embodiment of a block diagram of a computer system useful for implementing the method illustrated in the flow diagram of FIG. 4.

The computer system 500 can be a xerographic system, a photocopier, or printing device. The computer system includes one or more processors, such as processor 506 capable of executing machine executable program instructions. In the embodiment shown, the processor is in communication with bus 502 (e.g., a backplane interface bus, crossover bar, or data network). The computer system also includes a main memory 504 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 566 to temporarily store data for access by the processor, and a program memory 564 that includes, for example, executable programs that implement the methods described herein. The program memory is capable of storing a subset of the data that is less than all of the data contained in the buffer.

Computer system 500 includes a display interface 508 that forwards data from communication bus 502 (or from a frame buffer not shown) to display 510. The computer system also includes a secondary memory 512. The secondary memory may include, for example, a hard disk drive 514 and/or a removable storage drive 516 which reads and writes to removable storage unit 518, such as a floppy disk, magnetic tape, optical disk, etc., that stores computer software and/or data.

In an alternative embodiment, the secondary memory 512 includes other similar mechanisms for allowing computer programs or other instructions to be loaded into the computer system. Such mechanisms may include, for example, a removable storage unit 522 adapted to exchange data through interface 520. Examples of such mechanisms include a program cartridge and cartridge interface (such as that found in video game devices), a removable memory chip (such as an EPROM, or PROM) and associated socket, and other removable storage units and interfaces 520 which allow software and data to be transferred from the removable storage unit to the computer system. The computer system 500 includes a communications interface 524 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 524. These signals are provided to communications interface via a communications path (i.e., channel) 526 which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 504 and secondary memory 512, removable storage drive 516, a hard disk installed in hard disk drive 514, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for automatically selecting a subset of representative pages from a multi-page document, the method comprising:
receiving a multi-page document and a predefined number of representative pages wherein each page contains at least one color object;
for each page in said multi-page document, extracting at least one feature vector that encapsulates relevant content in said document to produce a feature vector space;

arranging each of said features into vectors to form a matrix;

analyzing said matrix to obtain a set of basis vectors describing said feature vector space;

assigning each page to a most closely matched basis vector to form page clusters;

selecting from each page cluster at least one representative page; and using said representative pages as input to a secondary process.

2. The method of claim 1, further comprising representing each page by a feature that is related to said imaging operation.

3. The method of claim 1, further comprising:

clustering said pages by a subspace projection of features onto said set of basis vectors; and assigning each of said pages to a cluster to which said page maximally projects.

4. The method of claim 1, wherein said selecting from each page cluster at least one representative page comprises at least one of: selecting a page that is closest to a basis vector corresponding to said cluster, and selecting pages that are mutually maximally separated.

5. The method of claim 1, wherein said secondary process comprises one of: deriving imaging operations to be applied to the document, automated document analysis, and manual document analysis.

6. The method of claim 1, wherein said feature vector comprises a multi-dimensional color histogram.

7. The method of claim 1, wherein analyzing said matrix into said set of basis vectors comprises a rank reduction technique involving one of: a Singular Value Decomposition, a non-negative matrix approximations, or Independent Component Analysis.

8. A system for automatically selecting a subset of representative pages from a multi-page document, the system comprising:

a storage medium capable of storing data; and a processor in communication with said storage medium, said processor capable of executing a machine readable instruction for performing the method of:

receiving a multi-page document and a predefined number of representative pages wherein each page contains at least one color object;

for each page in said multi-page document, extracting at least one feature vector that encapsulates relevant content in said document to produce a feature vector space;

arranging each of said features into vectors to form a matrix;

analyzing said matrix to obtain a set of basis vectors describing said feature vector space;

assigning each page to a most closely matched basis vector to form page clusters;

selecting from each page cluster at least one representative page; and using said representative pages as input to a secondary process.

9. The system of claim 8, further comprising representing each page by a feature that is related to said imaging operation.

10. The system of claim 8, further comprising:

clustering said pages by a subspace projection of features onto said set of basis vectors; and assigning each of said pages to a cluster to which said page maximally projects.

11. The system of claim 8, wherein said selecting from each page cluster at least one representative page comprises at least one of: selecting a page that is closest to a basis vector corresponding to said cluster, and selecting pages that are mutually maximally separated.

12. The system of claim 8, wherein said secondary process comprises one of: deriving imaging operations to be applied to the document, automated document analysis, and manual document analysis.

13. The system of claim 8, wherein said feature vector comprises a multi-dimensional color histogram.

14. The system of claim 8, wherein analyzing said matrix into said set of basis vectors comprises a rank reduction technique involving one of: a Singular Value Decomposition, a non-negative matrix approximations, or Independent Component Analysis.

15. A computer program product for automatically selecting a subset of representative pages from a multi-page document, the computer program product comprising:

a non-transitory computer readable media for storing instructions that, when executed on a computer, cause the computer to perform a method comprising:

receiving a multi-page document and a predefined number of representative pages wherein each page contains at least one color object;

for each page in said multi-page document, extracting at least one feature vector that encapsulates relevant content in said document to produce a feature vector space;

arranging each of said features into vectors to form a matrix;

analyzing said matrix to obtain a set of basis vectors describing said feature vector space;

assigning each page to a most closely matched basis vector to form page clusters;

selecting from each page cluster at least one representative page; and using said representative pages as input to a secondary process.

16. The computer program product of claim 15, further comprising representing each page by a feature that is related to said imaging operation.

17. The computer program product of claim 15, further comprising:

clustering said pages by a subspace projection of features onto said set of basis vectors; and assigning each of said pages to a cluster to which said page maximally projects.

18. The computer program product of claim 15, wherein said selecting from each page cluster at least one representative page comprises at least one of: selecting a page that is closest to a basis vector corresponding to said cluster, and selecting pages that are mutually maximally separated.

19. The computer program product of claim 15, wherein said secondary process comprises one of: deriving imaging operations to be applied to the document, automated document analysis, and manual document analysis.

20. The computer program product of claim 15, wherein analyzing said matrix into said set of basis vectors comprises a rank reduction technique involving one of: a Singular Value Decomposition, a non-negative matrix approximations, or Independent Component Analysis.

21. The computer program product of claim 15, wherein said feature vector comprises a multi-dimensional color histogram.

* * * * *